3,806,527
PROCESS FOR THE ADDITION OF BISULFITE
TO UNSATURATED COMPOUNDS
Ronnie D. Gordon, Richardson, Tex., assignor to Continental Oil Company, Ponca City, Okla.
No Drawing. Filed June 21, 1972, Ser. No. 265,076
Int. Cl. C07c 143/90
U.S. Cl. 260—400                              6 Claims

ABSTRACT OF THE DISCLOSURE

Water-soluble sulfite compounds may be reacted with unsaturated organic compounds in an aqueous medium in the presence of activated charcoal or carbon to produce good conversions and yields of sulfonates.

DISCLOSURE

This invention relates to a process for preparing organic sulfonates by the addition of bisulfite to unsaturated compounds. More particularly, the invention relates to the addition of a water-soluble sulfite compound to unsaturated organic compounds in an aqueous medium in the presence of activated charcoal or activated carbon.

It is known to react compounds containing olefinic double bonds with bisulfite ions in aqueous solution in the presence of free radical initiation to produce organic sulfonates. Conversions in this reaction, however, are relatively low unless reaction times of economically prohibitive lengths are employed. As a result, there have been various suggestions in the art to improve the conversion and yields of the reaction as indicated in U.S. 2,653,970; U.S. 3,424,770; and U.S. 3,479,397. Some of these suggestions have involved controlling the pH of the aqueous bisulfite solutions to a range between 6 and 9, using molecular oxygen for free radical initiation, employing various polar solvents or hydrotropic-acting agents, and the use of specific catalyst such as hydrochlorous acid, chlorine dioxide and various metal salts.

In accordance with this invention, it has unexpectedly been found that the addition of bisulfite ions to unsaturated organic compounds in an aqueous media in the presence of free radical initiation may be accomplished in the presence of activated charcoal or activated carbon to achieve good conversions and yields to the corresponding sulfonates. The invention has advantages over various prior art approaches in that the activated charcoal or activated carbon employed is relatively inexpensive and readily available and also that reagents which may complicate recovery of the sulfonate product need not be employed.

The organic compounds employed in the invention may be generally described as those containing olefinic double bonds and include such compounds as aliphatic olefins; partially hydrogenated aromatic compounds such as cycloalkenes and cycloalkadienes; aromatic compounds with unsaturated aliphatic side chains; carboxylic acid esters with an unsaturated alcohol group such as fatty acid allyl esters; and esters from unsaturated fatty acids and saturated alcohols. In place of these esters, corresponding aliphatic, hydro-aromatic or aliphatic-aromatic ethers, amines, carbamides or sulfonamides, containing unsaturated bonds, may also be employed. It is also pointed out that the organic compounds may contain multiple unsaturation, either conjugated or isolated, such as esters of unsaturated carboxylic acids with unsaturated alcohols, aliphatic diolefins and others. Of the above compounds, there is a general preference for alkadienes having 6 to 22 carbon atoms, alkenylalkanoates having 10 to 24 carbon atoms, alkenyl-benzenes having 10 to 30 carbon atoms, alkyl higher-alkenoates having 10 to 24 carbon atoms, alkenyl-alkenoates having 10 to 24 carbon atoms, cyclohexene, cyclohexadiene, and, most preferably olefins having 3 to 50 carbon atoms. While the olefins may be straight or branched chain, with internal or terminal unsaturation, α-olefins are preferred. As indicated above the α-olefins may contain 3 to 50 carbon atoms, more preferably 6 to 35 carbon atoms. Mixtures of organic compounds may also be employed to produce a corresponding mixture of sulfonates.

The source of the bisulfite ion may be a sulfite compound from an alkali metal bisulfite, pyrosulfite, or metabisulfite; zinc bisulfite; aluminum bisulfite; ammonium bisulfite; or mixtures thereof. Preferably, the bisulfites of sodium, potassium, zinc, aluminum, lithium and ammonia are employed. In general, about 0.1 to about 10 mols of sulfite compound are employed per mol equivalent of double bond in the unsaturated organic compound with the preferred amount being about 0.5 to about 5 mols of bisulfite per mole equivalent of double bond.

Some water is necessary to at least partially solubilize the sulfite compound and generally will be employed in amounts of about 1 to about 75 weight percent based upon the reaction mixture. However, it is preferred not to employ excessive amounts of water much above that which is necessary to provide a saturated solution of the sulfite compound. This is to avoid formation of emulsions which might occur with excessive amounts of water in the presence of the product sulfonates.

As indicated above, the process is conducted in the presence of free radical initiation. This may be provided in a variety of ways such as providing oxygen or an oxygen-containing gas to the reaction system. Alternatively, various other free radical initiators may be employed such as diazo compounds, peroxides, ultraviolet light and radiation. All of these initiation techniques are well-known in the art and their applicability to the reaction of the invention will be readily understood. It is pointed out, however, that employment of peroxides for the free radical initiation will result in rapid preferential reaction with the bisulfite. As a result, considerable amounts of peroxide may be expended in reaction with the sulfite compound, thus reducing the amount available for free radical initiation. For this reason, oxygen, diazo compounds, ultraviolet light and radiation are the preferred initiation systems. The amount or degree of free radical initiation may be easily determined by those skilled in the art as indicated by the U.S. patents referred to hereinbefore and does not constitute an essential feature of the invention.

The activated charcoal, activated carbon or mixtures thereof, which unexpectedly enables the reaction to proceed with good conversion and yields, may be employed in amounts ranging from about 0.1 to 150 weight percent based on the organic compound containing olefinic unsaturation. In general, greater amounts will provide increased reaction rates. Preferably, the activated charcoal or activated carbon is employed in an amount ranging from about 1 to 50 weight percent based on the organic compound.

Generally, the reaction will be conducted at temperatures ranging from about 20° C. up to about 300° C.

The reaction may be conducted by merely charging the above-described reaction ingredients to a stirred vessel and subjecting them to the stated conditions on a batch basis. Alternatively, the activated charcoal or activated carbon may be formed into a fixed bed or fluidized bed and the remaining reaction ingredients pass through the bed on a continuous basis while being subjected to the stated conditions.

After completion of the reaction, the reaction product mixture will generally separate into an organic phase and an aqueous phase. In the case of water-soluble sulfonates, the aqueous phase containing the sulfonate product may then be decanted from the organic phase and ejected to evaporative conditions to remove the water. In the case of oil-soluble sulfonates, the organic phase containing the sulfonate may be subjected to distillation. Other conventional recovery techniques will occur to those skilled in the art. While the reaction is not particularly sensitive, the pH will generally range from about 4 to 9. This normally occurs using the proportions of reactants outlined above.

The following examples will serve to further illustrate the process of this invention.

EXAMPLE 1

A 300 ml. stirred autoclave was charged with 25 ml. (0.11 mol) 1-dodecene, 21 g. (0.2 mol) sodium bisulfite, 50 ml. water and 0.5 g. activated charcoal. Oxygen was then charged to a partial pressure of about 5 p.s.i. as the free radical initiator. The reaction mixture was then heated to 100° C. and stirred for about three hours. At the end of this reaction period, the reaction product mixture separated into an organic phase containing the unreacted 1-dodecene and an aqueous phase containing the sulfonate product. The aqueous phase was separated and the water was evaporated to give sodium dodecyl sulfonate which by GLC analysis was of about 96% purity and amounted to an olefin conversion to the sulfonate of about 72%.

By comparison, when the same reaction is duplicated except that the activated charcoal is omitted the olefin conversion is less than about 5% conversion.

For further comparison, as indicated in U.S. 3,479,397, a reaction mixture comprising 0.2 mol sodium bisulfite, 0.22 mol 1-dodecene, 50 ml. water and 50 ml. isopropanol was charged to a Parr vessel followed by shaking at 80° C. for 20 hours under a partial oxygen pressure of 1 p.s.i. and produced only 24% olefin conversion.

EXAMPLE 2

Following the procedure of the invention described in Example 1 except for substituting 1-heptadecene and potassium bisulfite for the reactants and using activated carbon similar results may be obtained.

EXAMPLE 3

Similar good conversions may be obtained following the procedure of the invention as described in Example 1 and the foregoing description using the following combinations in the reaction mixture.

TABLE

| Organic Compound | Bisulfite | Initiation | Activated Charcoal or carbon |
|---|---|---|---|
| Propylene | $NAHSO_3$ | $O_2$ | Charcoal. |
| Cyclohexene | $LiHSO_3$ | Radiation | Carbon. |
| 1-heptene | $Na_2S_2O_5$ | UV | Do. |
| Lauric acid allyl ester | $NaHSO_3$ | $O_2$ | Charcoal. |
| Cyclohexadiene | $KHSO_3$ | Benzoyl peroxide | Carbon. |
| $C_{30}$ α-olefin | $K_2S_2O_5$ | UV | Charcoal. |
| $C_{35}$ α-olefin | $Ca(HSO_3)_2$ | $O_2$ | Carbon. |
| Cyclopentadiene | $NH_4HSO_3$ | Azoisobutyro nitrile. | Do. |
| Undecylenic acid methyl ester. | $NaHSO_3$ | ___do___ | Do. |
| $C_{24}$ α-olefin | $Na_2S_2O_5$ | Sodium persulfate. | Charcoal. |
| Hexadecene-1 | $K_2S_2O_5$ | Azoisobutyro nitrile. | Do. |
| Pentene-1 | $KHSO_3$ | ___do___ | Carbon. |
| 2-phenyl-dodecene-1 | $Ca(HSO_3)_2$ | ___do___ | Do. |

EXAMPLE 4

Similar results may be achieved using an olefin mixture (predominantly 2-tetradecyl-1-octadecene) produced by dimerizing 1-heptadecene by heating with a catalytic amount (5–10 weight percent) of diisobutyl aluminum hydride and following the procedure of Example 1.

Thus, having described the invention in detail, it will be understood by those skilled in the art that certain variations and modifications may be made without departing from the spirit and scope of the invention as described herein and in the appended claims.

I claim:

1. A process for the preparation of organic sulfonates by the addition of a bisulfite to the double bonds of an organic compound containing olefinic double bonds which comprises reacting (1) at least one organic compound containing olefinic double bonds selected from the group consisting of alkadienes having 6 to 22 carbon atoms, alkenylalkanoates having 10 to 24 carbon atoms, alkylbenzenes having 10 to 30 carbon atoms, alkyl higher-alkenoates having 10 to 24 carbon atoms, alkenyl-alkenoates having 10 to 24 carbon atoms, cyclohexene, cyclohexadiene, and olefins having 3 to 50 carbon atoms, with (2) at least one water-soluble sulfite compound selected from the group consisting of alkali metal pyrosulfites, alkali metal bisulfites, alkali metal metasulfites, zinc bisulfite, aluminum bisulfite, and ammonium bisulfite, in an aqueous medium in the presence of free radical initiation and about 0.1 to 150 weight percent based on the organic compound containing olefinic double bonds of a material selected from the group consisting of activated charcoal, activated carbon or mixtures thereof.

2. A process according to claim 1 wherein the organic compound containing olefinic double bonds is an α-olefin having 3 to 50 carbon atoms or mixtures thereof.

3. A process according to claim 1 wherein the sulfite compound is sodium bisulfite, potassium bisulfite, sodium pyrosulfite, potassium pyrosulfite, ammonium bisulfite or calcium bisulfite.

4. A process according to claim 1 wherein about 0.1 to about 10 mols of sulfite compound are employed per mol of double bond in the organic compound.

5. A process according to claim 1 wherein the free radical initiation is provided by oxygen, UV light, radiation or a peroxide.

6. A process according to claim 1 wherein the organic compound having olefinic double bonds is an α-olefin having 6 to 35 carbon atoms.

References Cited
UNITED STATES PATENTS 3,424,770  1/1969  Stein et al. _____ 260—400
3,579,546  5/1970  Norton _____ 260—400

ELBERT L. ROBERTS, Primary Examiner